United States Patent [19]

Witkin et al.

[11] 4,013,394
[45] Mar. 22, 1977

[54] HOT ISOSTATIC PRESS SYSTEM

[75] Inventors: Donald E. Witkin; Arnold G. Bowles, both of Warren, Pa.

[73] Assignee: National Forge Company, Irvine, Pa.

[22] Filed: Aug. 18, 1975

[21] Appl. No.: 605,416

[30] Foreign Application Priority Data

Aug. 19, 1974 Japan .............................. 49-94876

[52] U.S. Cl. .......................... 425/405 H; 425/77; 425/78; 425/DIG. 26; 266/186; 432/249

[51] Int. Cl.² ...................... B29C 3/00; B22F 3/00

[58] Field of Search ............... 425/78, 406, 405 H, 425/77, DIG. 26; 432/249, 251, 120, 205; 266/24

[56] References Cited

UNITED STATES PATENTS

| 3,419,935 | 1/1969 | Pfeiler et al. ........................ 425/78 |
| 3,427,011 | 2/1969 | Boyer et al. .................... 425/405 H |
| 3,613,157 | 10/1971 | Landa et al. .................... 425/405 H |
| 3,732,068 | 5/1973 | Larker ............................. 425/78 X |
| 3,787,156 | 1/1974 | Landa et al. ............. 425/405 H X |
| 3,900,189 | 8/1975 | Elmgren et al. ................. 425/78 X |

*Primary Examiner*—Robert L. Spicer, Jr.
*Attorney, Agent, or Firm*—Charles B. Smith

[57] ABSTRACT

The invention relates to means for establishing an equalized pressure across the insulating sheath of a hot isostatic press system. Tubes are positioned in the outer, insulation portion of the sheath to provide a substantially resistance free passage between a source of high pressure gas input to the system and the upper portions of the sheath. The invention also tends to reduce convection currents in the furnace chamber.

19 Claims, 4 Drawing Figures

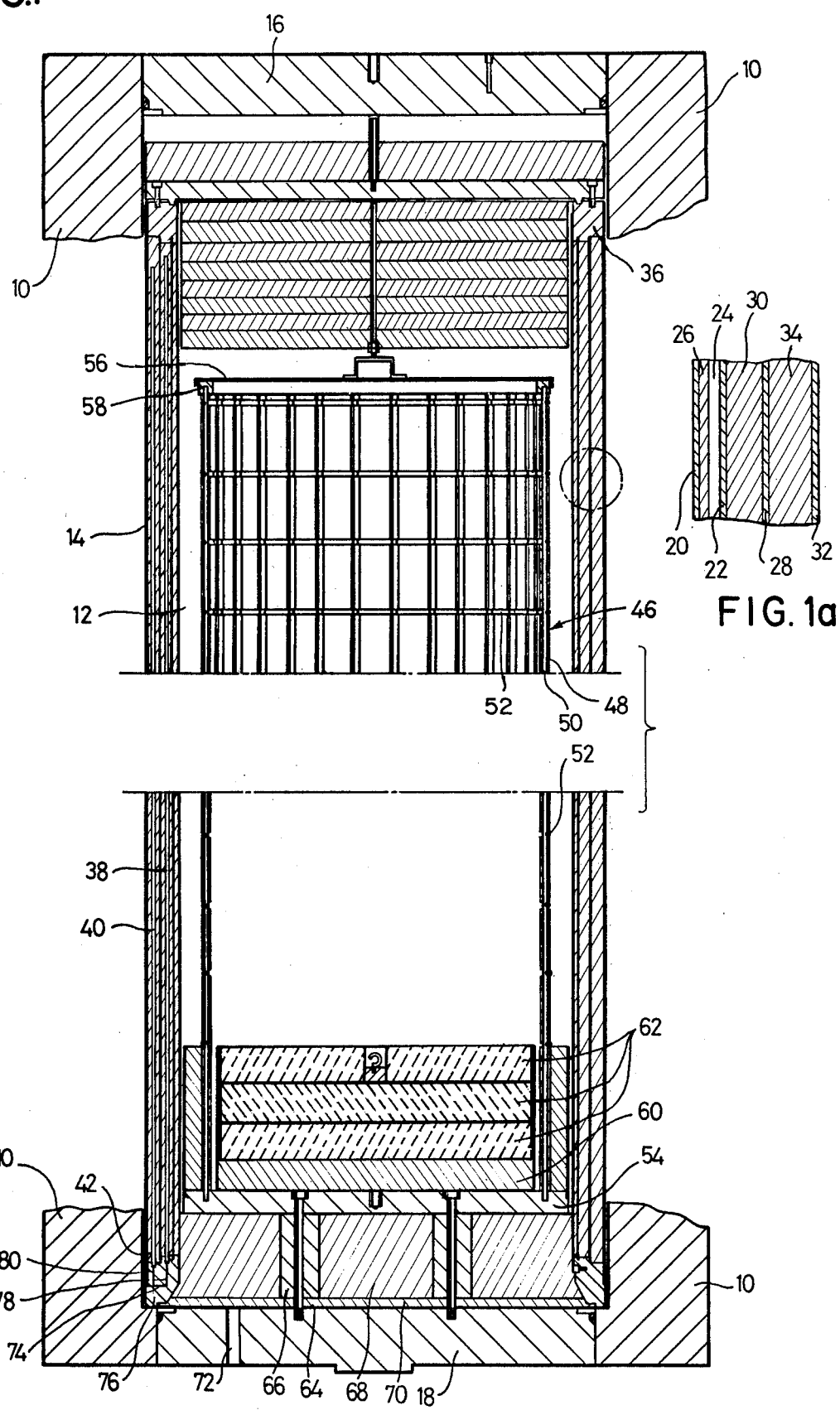

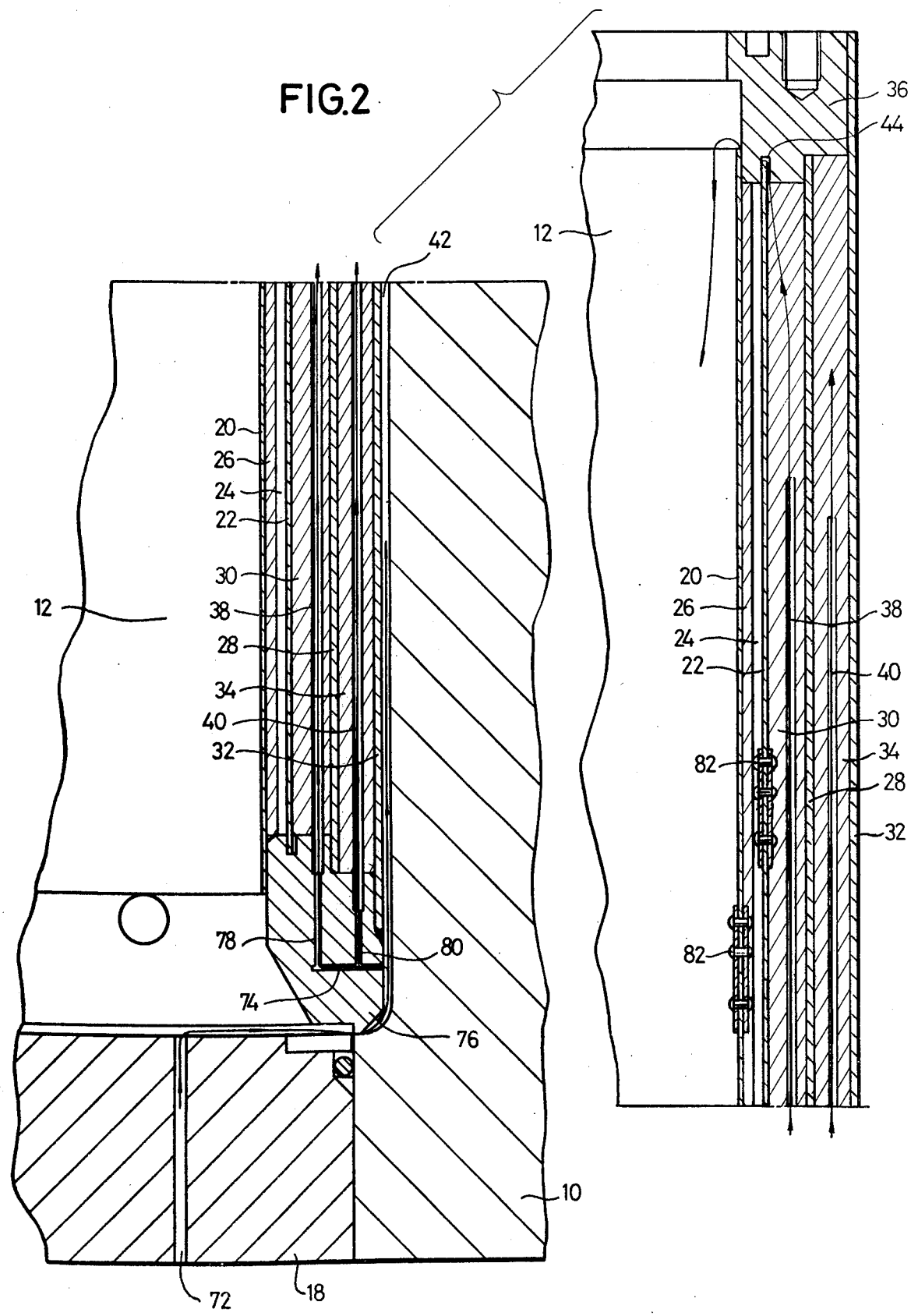

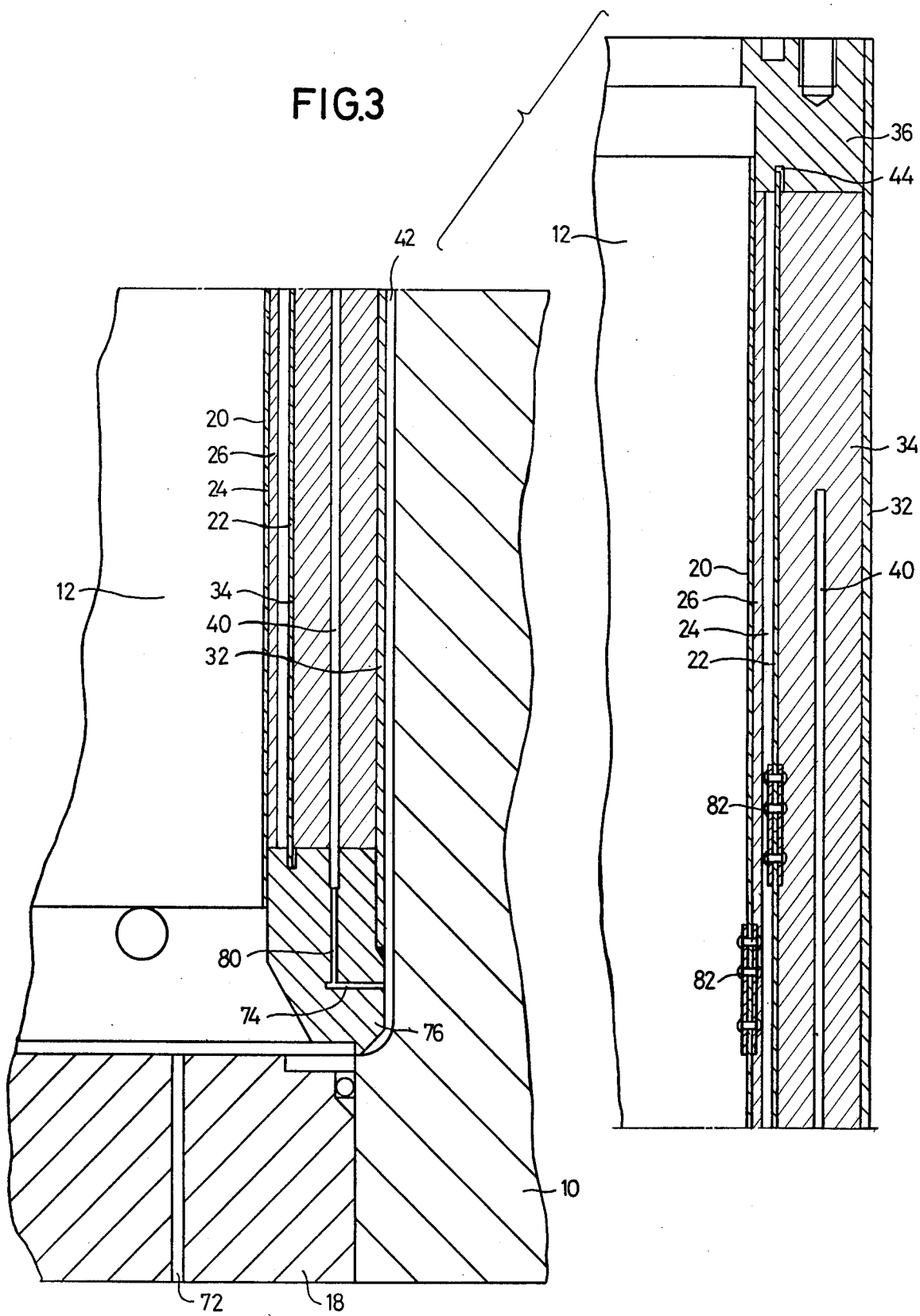

HOT ISOSTATIC PRESS SYSTEM

BACKGROUND OF THE INVENTION

This invention relates to a hot isostatic press system and more particularly to equalizing the pressure across a sheath insulating portion of the press system.

Various types of hot isostatic presses have been proposed to compact powdered materials such as ceramics, metals, plastics or composite materials by isostatic pressing with a fluid pressurizing medium. In an isostatic press of the type which comprises a substantially cylindrical vessel encasing a furnace chamber through a heat insulating sheath, it is advantageous to quickly equalize the pressure across the insulating sheath to minimize any stess to which the heat insulating sheath may be subjected and to reduce convection currents in the furnace chamber. Stresses across the insulating sheath may cause one or more of its component parts to distort at high temperatures.

SUMMARY OF THE INVENTION

It is therefore an object of the invention to provide an isostatic press in which the pressure across the insulating sheath is quickly equalized to protect the insulating sheath from damage or destruction due to excessive pressure differentials and to reduce convection currents within the furnace chamber.

The invention relates to a hot isostatic press system which comprises a substantially cylindrical vessel, a top cover assembly for closing a top end of the vessel, a bottom cover assembly for closing a bottom end of the vessle, a heat insulating sheath positioned within the vessel to define a furnace chamber, and a heating element positioned to heat the furnace chamber. The invention features a plurality of elongated tubes disposed in the heat insulating sheath at predetermined locations. One end of each tube is connected to a source of high pressure gas and the other end of each tube is open to a top portion of the heat insulating sheath and hence to the furnace chamber.

In one embodiment, the invention features the tubes at one end connected to an annular space between the vessel wall and the heat insulating sheath. At the other end the insulating tubes have radially directed holes.

The heat insulating sheath comprises a primary hot shell encircling the furnace chamber, a secondary hot shell encircling the primary hot shell through an annular space with a first insulation barrier, an inner can encircling the secondary hot shell with a second insulation barrier and an outer can encircling the inner can with a third insulation barrier.

In one particular embodiment, the elongated tubes are disposed within the insulating sheath so that the bottom ends of the tubes communicate with an annular space formed between an inner wall of the vessel and the outer periphery of the insulation sheath and the upper ends communciate with the furnace chamber. High pressure gas, supplied from an inlet provided in the bottom closure to the furnace chamber, is quickly passed through the upright tubes and flows into the furnace chamber near the top closure. In the absence of the vertically elongated tubes, it would take longer for the pressure across the insulating sheath to equalize along its vertical length. The vertically positioned tubes also allow pressure equalization to take place in a manner which reduces the possibility of creating undesirable convection paths during operation of the system, because the top of each of the elongated tubes is in a region which is hotter than the bottom and there is no natural tendency for convection flow to take place, the hotter and less dense fluid already being at the top of the tubes.

BRIEF DESCRIPTION OF THE DRAWINGS

Other objects, features, and advantages of the invention will appear from the following description of particular embodiments of the invention taken together with the attached drawings thereof, in which:

FIG. 1 is a longitudinally sectioned view of a press in accordance with the invention;

FIG. 1A is an enlarged view of the press wall structure.

FIG. 2 is a fragmentary enlarged sectional view of the press side portion of one embodiment; and FIG. 3 is a fragmentary enlarged sectional view of the press side portion of another embodiment.

DESCRIPTION OF PARTICULAR EMBODIMENTS

Referring to FIG. 1, the hot isostatic press according to the invention comprises a substantially cylindrical vessel generally indicated as reference number 10 which accommodates therein a furnace chamber 12 through a heat insulating sheath 14. Vessel 10 is closed by a top cover assembly 16 and a bottom cover assembly 18.

Referring to FIGS. 1 and 2, in a particular embodiment of the invention, the heat insulating sheath 14 includes a primary molybdenum hot shell 20 and a secondary molybdenum hot shell 22 encircling the primary molybdenum hot shell 20 through an insulation barrier consisting here of an annular space 24 and an insulation material 26 such as fiberchrome paper. An inner stainless steel can 28 with an insulation barrier 30 encircles the secondary molybdenum hot shell. An outer stainless steel can 32 with an insulating barrier 34 encircles stainless steel can 28. Insulating barriers 30 and 34 may also be, for example, fiberchrome, a material which is porous to gaseous flow.

The top of the secondary molybdenum hot shell 22 engages a jacket alignment ring 36 in a slip fit arrangement so that the high pressure gas may flow into the furnace chamber 12 as hereinafter described. The slip fit also permits the molybdenum hot shell 22 to expand thermally an amount different from other parts of the structure without constraint, thus avoiding thermal stresses.

In the insulating sheath, between the secondary molybdenum hot shell 22 and the inner stainless steel can 28 and also between the inner stainless steel can 28 and the outer stainless steel can 32, are disposed a plurality of upright tubes 38 and 40 at predetermined locations around the furnace chamber. The bottom open ends of the tubes 38 and 40 are connected to a high pressure gas source (not shown) and are in communication with an annular space 42 formed between the inner circumferential wall of the vessel 10 and the outer periphery of the outer stainless steel can 32. The top open ends of the tubes 38 communicate with the furnace chamber 12 through a clearance 44 formed between the top end of the secondary molybdenum hot shell 22 and the jacket alignment ring 36. The top end of tubes 38 and 40 may also have radially directed holes to aid in decreasing the velocity of air flow at the tube-insulation interface.

Referring to FIG. 3, in another embodiment of the invention, the heat insulating sheath 14 includes the primary molybdenum hot shell 20, the secondary molybdenum hot shell 22 encircling the primary molybdenum hot shell 20 through an insulation barrier comprising the annular space 24 and insulation material 26, and the outer stainless steel can 32 with insulation barrier 34 surrounding the secondary molybdenum hot shell 22. Between the secondary molybdenum hot shell 22 and the outer stainless steel can 32 are interposed a plurality of upright tubes 40 within the insulation barrier 34. The tubes 40 communicate at their top ends with the furnace chamber 12 through the clearance 44 formed between the top of the secondary molybdenum hot shell 22 and the jacket alignment ring 36 and at their bottom ends with the annular space 42 formed between the vessel body 10 and the heat insulating sheath 14.

In the furnace chamber 12 of either embodiment there is positioned a heating element 46 to heat the chamber. Heating element 46 preferably comprises a plurality of vertical insulating tubes 48 each containing a molybdenum rod 50. The heating element also preferably includes a number of crossing molybdenum wires 52. Heating element 46 is supported by a furnace base plate 54, the top of which is covered by a molybdenum shield 56 maintained in position by a molybdenum alignment ring 58. In the bottom of the heating element is mounted a load support can 60 in which three refractory filled cans 62 are accommodated.

The furnace base plate 54 is secured to the bottom cover 18 by screws 64 with spacers 66 and through a fiber insulation 68 and an insulating paper 70.

The bottom cover 18 is provided with a vertical slot 72 for passing high pressure gas into the heat insulation sheath 14, the annular space 42 and the furnace chamber 14. The high pressure gas, supplied from a supply source (not shown), flows through the slot 72, and directly into the furnace chamber 12 and the annular space 42. A horizontal channel 74, provided in the bottom jacket alignment ring 76 and having vertical branches 78 and 80 communicating with the upright tubes 38, 40, passes the gas from space 42 to tubes 38, 40. The high pressure gas flows through the vertical branches 78 and 80 into the upright tubes 38 and 40. Referring to FIG. 2, the gas, rising through upright tube 38, further passes through the fiberchrome insulation 30, then through the clearance 44, and into an upper portion of the furnace chamber 12. Thus, a quick pressure equalization may be attained among the annular space 42, the heat insulating sheath 14, and the furnace chamber 12.

The primary and secondary molybdenum hot shells 20 and 22 may be intermediately joined together, for example, by means of rivets 82 (FIGS. 2 and 3) so that gas may flow through the joined portions into the furnace chamber if the pressure within the heat insulating sheath 14 has become excessively high.

Other embodiments will occur to those skilled in the art and are within the following claims

What is claimed is:

1. A hot isostatic press system comprising a substantially cylindrical vessel, a top cover assembly for closing a top end of the vessel, a bottom cover assembly for closing a bottom end of the vessel, a heat insulating sheath positioned within said vessel defining a furnace chamber, a heating element for heating said chamber, a plurality of elongated tubes circumferentially spaced in the heat insulating sheath, a first end of each tube being connected to a source of high pressure gas, and a second end of each tube opening to a top portion of said sheath and in communication with the furnace chamber.

2. The hot isostatic press system of claim 1 in which said tubes at their first ends are connected to an annular space formed between the vessel wall and the heat insulating sheath.

3. The hot isostatic press system of claim 1, wherein the heat insulating sheath comprises a primary hot shell encircling the furnace chamber, a secondary hot shell encircling said primary hot shell through a first insulation barrier, an inner can encircling said secondary hot shell with a second insulation barrier, and an outer can encircling said inner can with a third insulation barrier, and said plurality of elongated tubes disposed at least between the secondary hot shell and the inner can.

4. The hot isostatic press system of claim 3 in which said primary and secondary hot shells are formed from a plurality of interconnected cylindrically shaped tubes for providing pressure relief at high operation pressures.

5. The isostatic press system of claim 3 wherein elongated tubes are disposed between the inner can and the outer can.

6. The isostatic press system of claim 5 wherein said elongated tubes have at their second ends radially directed holes.

7. The hot isostatic press system of claim 1, wherein the heat insulating sheath comprises a primary hot shell encircling the furnace chamber, a secondary hot shell encircling said primary hot shell through a first insulation barrier, and an outer can encircling said secondary hot shell with a second insulation barrier, and a plurality of elongated tubes are disposed within said second insulation barrier.

8. The hot isostatic press system of claim 7 in which said primary and secondary hot shells are formed from a plurality of interconnected cylindrically shaped tubes for providing pressure relief at high operating pressures.

9. The isostatic press of claim 7 wherein said elongated tubes have at their second ends radially directed holes.

10. A hot isostatic press system comprising a substantially cylindrical vessel, a top cover for closing a top end of the vessel, a bottom cover for closing a bottom end of the vessel, a heat insulating sheath positioned within said vessel defining a furnace chamber, said insulating sheath comprising a primary hot shell encircling the furnace chamber, a secondary hot shell encircling the primary hot shell through an annular space and an insulation material, an inner can encircling the secondary hot shell through an insulation barrier and an outer can encircling the inner can through a second insulation barrier, a heating element for heating the furnace chamber, a plurality of elongated tubes disposed between the secondary hot shell and the inner can and between the inner can and the outer can, a first end of each tube being connected to a source of high pressure gas, and a second end of each tube opening to a top portion of said sheath and in communication with the furnace chamber.

11. A hot isostatic press system comprising a substantially cylindrical vessel, a top cover assembly for closing a top end of the vessel, a bottom cover assembly for closing a bottom end of the vessel, a heat insulating sheath positioned within the vessel defining a furnace chamber, the heat insulating sheath comprising a primary hot shell encircling the furnace chamber, a secondary hot shell surrounding the primary hot shell through an annular space and an insulation material, and an outer can surrounding the secondary hot shell, an insulating barrier positioned between the outer can and the secondary hot shell, a heating element for heating the furnace chamber, a plurality of elongated tubes disposed in said insulation barrier at predetermined locations, a first end of each tube being connected to a source of high pressure gas and a second end of each tube opening to a top portion of said insulation barrier and in communication with the furnace chamber.

12. The hot isostatic press sytem of claim 1 wherein the top portion of the heat insulating sheath is porous to the high pressure gas.

13. The hot isostatic press system of claim 12 wherein the tubes are in communication with the furnace chamber through the porous top portion of and a clearance formed in the heat insulating sheath.

14. The hot isostatic press system of claim 13 wherein the sheath has other portions that are porous and the tubes are spaced in the porous portion, whereby high pressure gas flows through the tubes, porous portions, and clearance into the furnace chamber.

15. The hot isostatic press system of claim 14 wherein the heating element extends through the furnace chamber from substantially one to the other end of the vessel.

16. In a hot isostatic press system having a substantially cylindrical vessel having covers for closing its ends, a heat insulating sheath positioned within the vessel defining a furnace chamber, a heating element positioned within the furnace chamber, the improvement comprising portions of the heat insulating sheath being porous to a high pressure gas and tubes in the heat insulating sheath, each tube having an end in communication with a source of the high pressure gas and an end in communication with the furnace chamber, whereby passing of the high pressure gas through the heat insulating sheath upon operation of the press equalizes pressure across the sheath along its vertical length.

17. The hot isostatic press system of claim 16 wherein the tubes are in communication with the furnace chamber through the porous portions of and a clearance formed in the heat insulating sheath.

18. The hot isostatic press system of claim 17 wherein the tubes are spaced in the porous portions of the heat insulating sheath, whereby the high pressure gas flows through the tubes, porous portions, and clearance into the furnace chamber upon passing of the gas through the sheath.

19. The hot isostatic press system of claim 18 wherein the heating element extends through the furnace chamber from substantially one to the other end of the vessel.

* * * * *